US008239671B2

(12) United States Patent
Oba

(10) Patent No.: US 8,239,671 B2
(45) Date of Patent: Aug. 7, 2012

(54) CHANNEL BINDING MECHANISM BASED ON PARAMETER BINDING IN KEY DERIVATION

(75) Inventor: Yoshihiro Oba, Englewood Cliffs, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1657 days.

(21) Appl. No.: 11/379,568

(22) Filed: Apr. 20, 2006

(65) Prior Publication Data
US 2007/0250706 A1 Oct. 25, 2007

(51) Int. Cl.
*H04L 9/00* (2006.01)
(52) U.S. Cl. ........................................ 713/155; 713/159
(58) Field of Classification Search ................. 713/155, 713/159
See application file for complete search history.

(56) References Cited

U.S. PATENT DOCUMENTS

| 2002/0120844 A1* | 8/2002 | Faccin et al. ................. 713/168 |
| 2003/0226017 A1* | 12/2003 | Palekar et al. ................ 713/168 |
| 2007/0091843 A1* | 4/2007 | Patel et al. .................... 370/331 |
| 2007/0143605 A1* | 6/2007 | Metke et al. .................. 713/168 |
| 2009/0019284 A1* | 1/2009 | Cho et al. ...................... 713/170 |

OTHER PUBLICATIONS

Toshiba et al., AAA-Key Derivation with Lower-Layer Parameter Binding draft-ohba-eap-aaakey-binding-01, Jun. 2005, pp. 1-18.*
Aboba et al. Extensible Authentication Protocol (EAP), Jun. 2004.*
Aboba et al. Extensible Authentication Protocol (EAP), Jun. 2004, The Internet Society, Standard Track.*
Aboba et al. Extensible Authentication Protocol (EAP), Jun. 2004, IETF, pp. 1-67.*
Arkko et al., Authenticated Service Information for the Extensible Authentication Protocol (EAP), Oct. 24, 2005, IETF, pp. 1-25.*

* cited by examiner

*Primary Examiner* — Brandon S Hoffman
*Assistant Examiner* — Samuel Ambaye
(74) *Attorney, Agent, or Firm* — Westerman, Hattori, Daniels & Adrian, LLP

(57) ABSTRACT

This document describes a channel binding mechanism based on parameter binding in the key derivation procedure. The method cryptographically binds access network parameters to a key without need to carry those parameters in EAP methods.

21 Claims, 6 Drawing Sheets

Relationship between EAP peer, authenticator and server

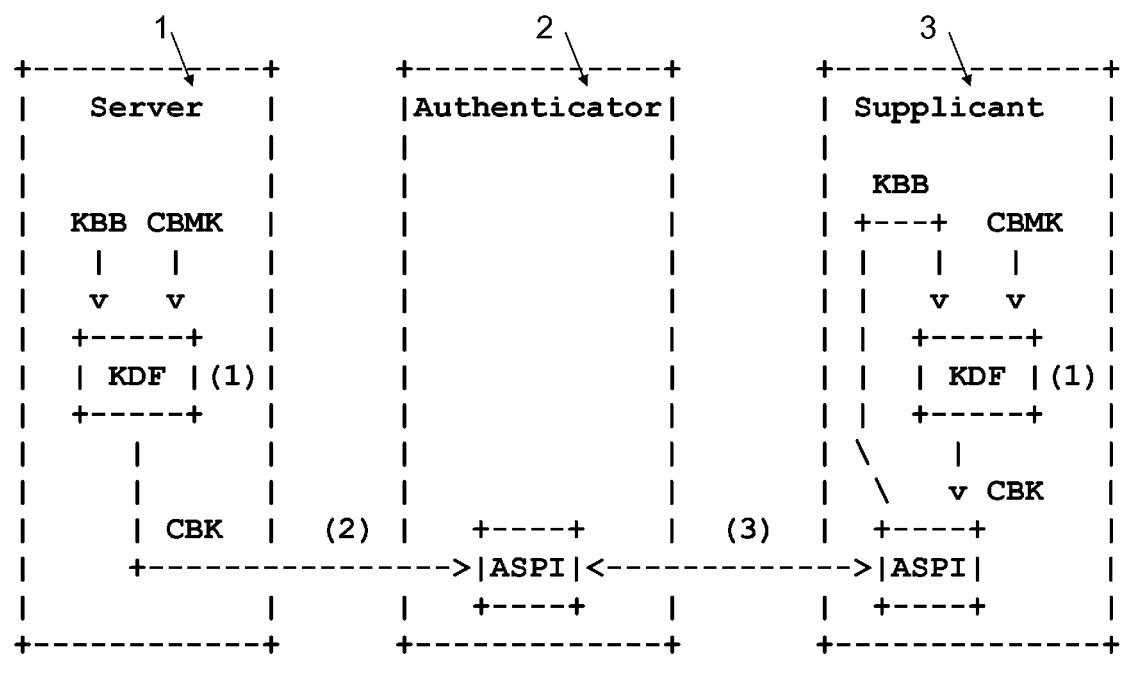
Figure 3: Basic Channel Binding Mechanism

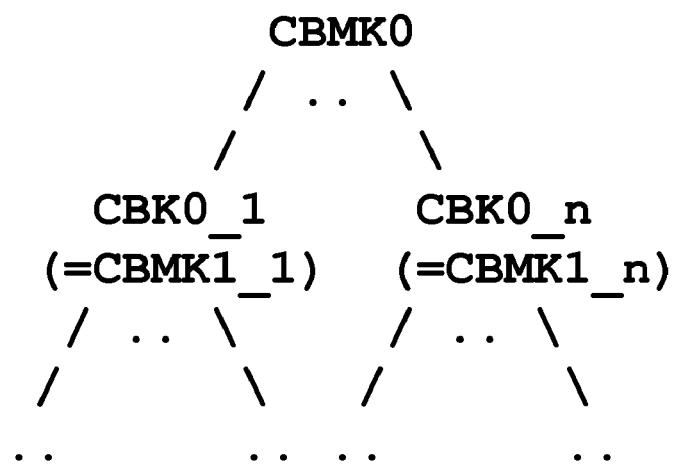
Figure 4: Hierarchical Channel Binding

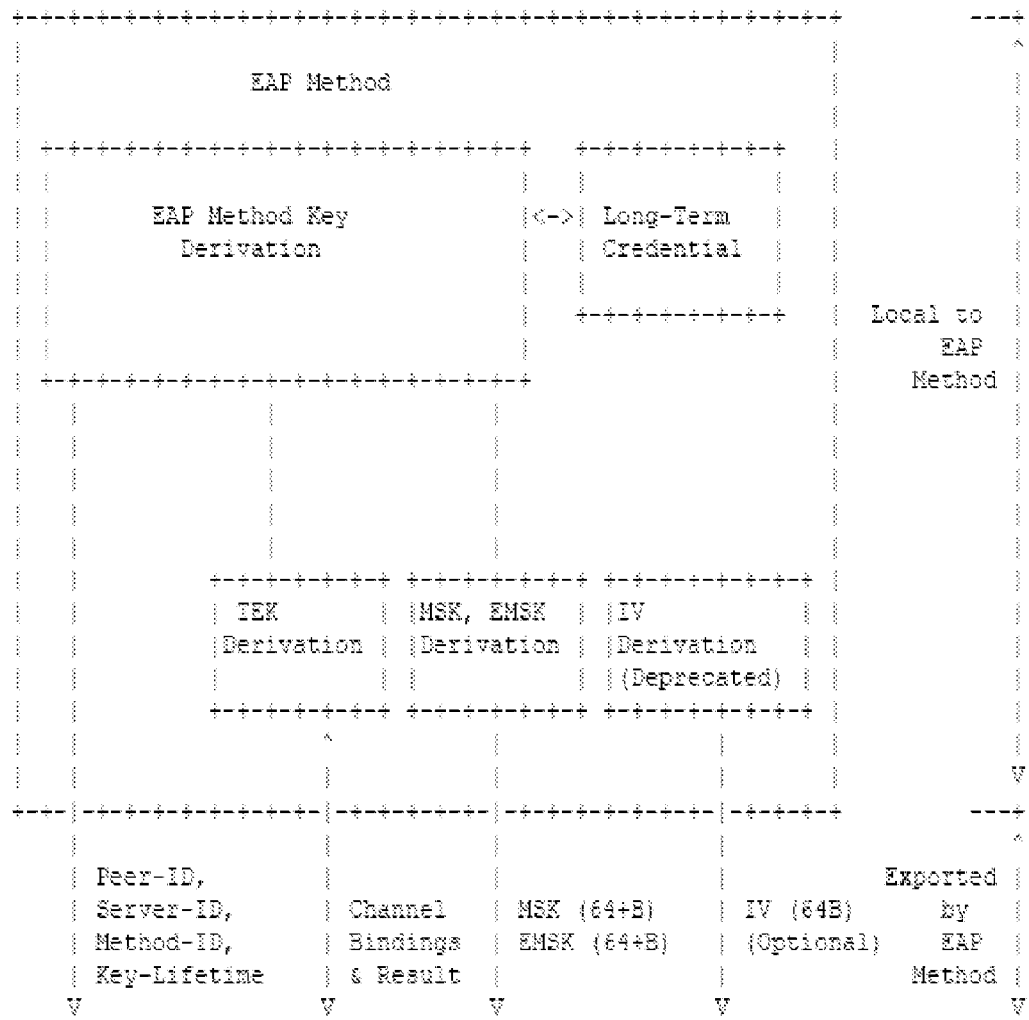
FIG. 5: EAP Method Parameter Import/Export
BACKGROUND ART

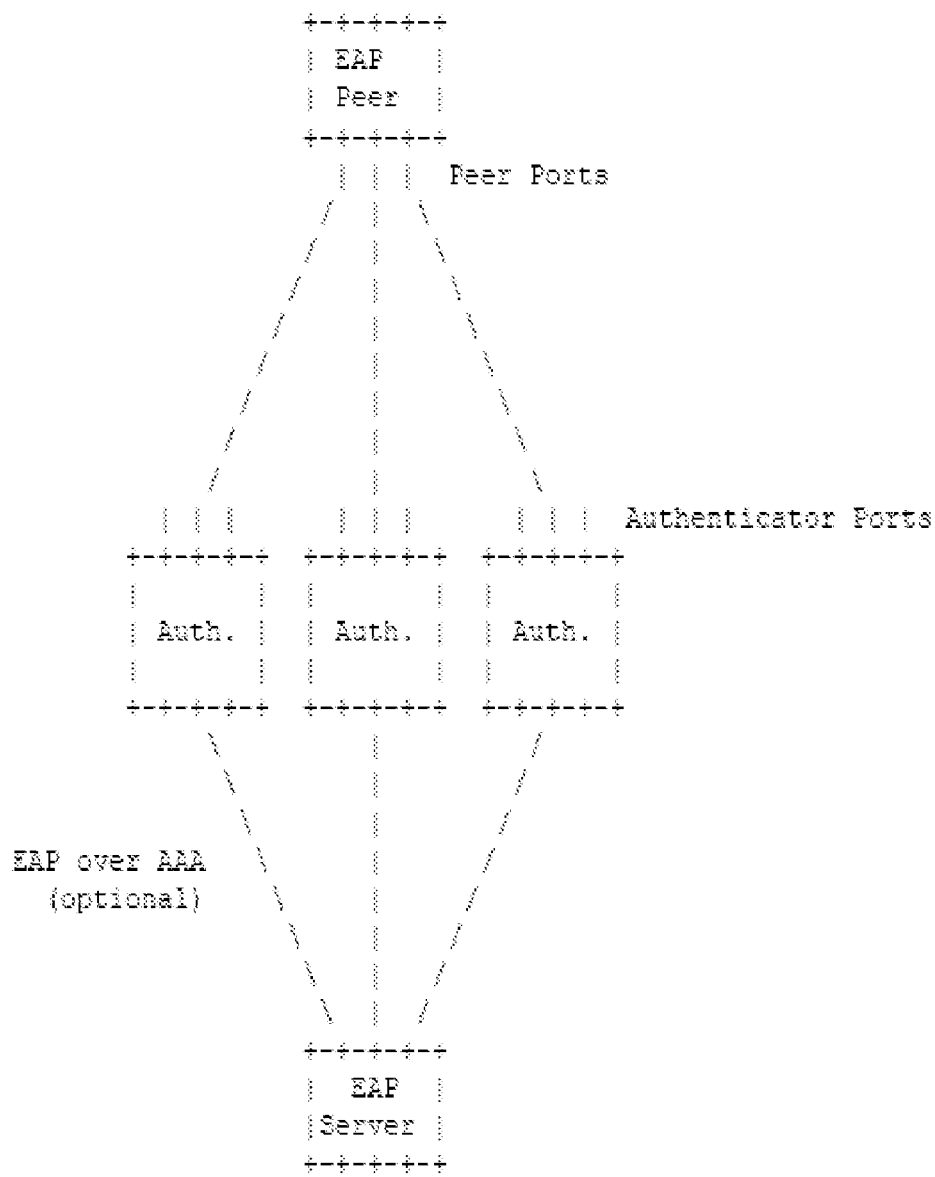
FIG. 6: Relationship between EAP peer, authenticator and server
BACKGROUND ART

CHANNEL BINDING MECHANISM BASED ON PARAMETER BINDING IN KEY DERIVATION

BACKGROUND

1. Field of the Invention

The present application relates to wireless communications and in particular to, inter alia, a methods and systems for channel binding parameters that are verified for consistency between a peer and a server.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

EAP:

This section sets forth background information related to Extensible Authentication Protocol (EAP). The contents of this section are quotations from the following article, EAP Key Management Framework, Internet Draft Apr. 13, 2006, Aboba, et al, the entire contents of which is also incorporated herein by reference.

"The Extensible Authentication Protocol (EAP), defined in [RFC3748], was designed to enable extensible authentication for network access in situations in which the IP protocol is not available. Originally developed for use with PPP [RFC1661], it has subsequently also been applied to IEEE 802 wired networks [IEEE-802.1X], wireless networks such as [IEEE-802.11i] and [IEEE-802.16e], and IKEv2 [RFC4306]." Id.

"In EAP, keying material is generated by EAP methods. Part of this keying material may be used by EAP methods themselves and part of this material may be exported. The exported keying material may be transported by AAA protocols or used by Secure Association Protocols in the generation or transport of session keys which are used by lower layer ciphersuites." Id.

"EAP, defined in [RFC3748], is a two-party protocol spoken between the EAP peer and server. Within EAP, keying material is generated by EAP methods. Part of this keying material may be used by EAP methods themselves and part of this material may be exported. In addition to export of keying material, EAP methods may also export associated parameters, and may import and export Channel Bindings from the lower layer." Id.

"As illustrated in FIG. 1 [see reproduction as FIG. 6 in the present patent application], the EAP method key derivation has at the root the long term credential utilized by the selected EAP method. If authentication is based on a pre-shared key, the parties store the EAP method to be used and the pre-shared key. The EAP server also stores the peer's identity as well as other information associated with it. This information may be used to determine whether access to some service should be granted. The peer stores information necessary to choose which secret to use for which service." Id.

"If authentication is based on proof of possession of the private key corresponding to the public key contained within a certificate, the parties store the EAP method to be used and the trust anchors used to validate the certificates. The EAP server also stores the peer's identity and the peer stores information necessary to choose which certificate to use for which service." Id.

"Based on the long term credential established between the peer and the server, EAP methods derive two types of keys: [1] Keys calculated locally by the EAP method but not exported by the EAP method, such as the TEKs; [2] Keying material exported by the EAP method: MSK, EMSK, IV. As noted in [RFC3748] Section 7.10, EAP methods generating keys are required to calculate and export the MSK and EMSK, which must be at least 64 octets in length. EAP methods also may export the IV; however, the use of the IV is deprecated." Id.

"EAP methods also may export method-specific peer and server identifiers (peer-ID and server-ID), a method-specific EAP conversation identifier known as the Method-ID, and the lifetime of the exported keys, known as the Key-Lifetime. EAP methods may also support the import and export of Channel Bindings. New EAP method specifications must define the Peer-ID, Server-ID and Method-ID. The combination of the Peer-ID and Server-ID uniquely specifies the endpoints of the EAP method exchange." Id.

"Channel Bindings include lower layer parameters that are verified for consistency between the EAP peer and server. In order to avoid introducing media dependencies, EAP methods that transport Channel Binding data MUST treat this data as opaque octets. Typically the EAP method imports Channel Bindings from the lower layer on the peer, and transmits them securely to the EAP server, which exports them to the lower layer. However, transport may occur from EAP server to peer, or may be bi-directional. On the side of the exchange (peer or server) where Channel Bindings are verified, the lower layer passes the result of the verification (TRUE or FALSE) up to the EAP method." Id.

"Each key created within the EAP key management framework has a name (a unique identifier), as well as a scope (the parties to whom the key is available). The scope of exported parameters is defined by the EAP peer name (if securely exchanged within the method) and the EAP server name (also only if securely exchanged). Where a peer or server name is missing the null string is used." Id.

"Certain basic characteristics, known as 'EAP Invariants', hold true for EAP implementations on all media: Mode independence; Media independence; Method independence; [and] Ciphersuite independence." Id.

Mode Independence

"EAP is typically deployed in order to support extensible network access authentication in situations where a peer desires network access via one or more authenticators. Where authenticators are deployed standalone, the EAP conversation occurs between the peer and authenticator, and the authenticator must locally implement an EAP method acceptable to the peer. However, one of the advantages of EAP is that it enables deployment of new authentication methods without requiring development of new code on the authenticator." Id.

"While the authenticator may implement some EAP methods locally and use those methods to authenticate local users, it may at the same time act as a pass-through for other users and methods, forwarding EAP packets back and forth between the backend authentication server and the peer. This is accomplished by encapsulating EAP packets within the Authentication, Authorization and Accounting (AAA) protocol, spoken between the authenticator and backend authentication server. AAA protocols supporting EAP include RADIUS [RFC3579] and Diameter [RFC4072]." Id.

"It is a fundamental property of EAP that at the EAP method layer, the conversation between the EAP peer and server is unaffected by whether the EAP authenticator is operating in 'pass-through' mode. EAP methods operate identically in all aspects, including key derivation and parameter imporVexport, regardless of whether the authenticator is operating as a pass-through or not." Id.

"The successful completion of an EAP method that supports key derivation results in the export of keying material on the EAP peer and server. Even though the EAP peer or server may import Channel-Bindings that may include the identity of the EAP authenticator, this information is treated as opaque octets. As a result, within EAP the only relevant identities are the Peer-ID and Server-ID. Channel Bindings are only interpreted by the lower layer." Id.

"Within EAP, the primary function of the AAA protocol is to maintain the principle of Mode Independence, so that as far as the EAP peer is concerned, its conversation with the EAP authenticator, and all consequences of that conversation, are identical, regardless of the authenticator mode of operation." Id.

Media Independence

"One of the goals of EAP is to allow EAP methods to function on any lower layer meeting the criteria outlined in [RFC3748], Section 3.1. For example, as described in [RFC3748], EAP authentication can be run over PPP [RFC1661], IEEE 802 wired networks [IEEE-802.1X], and IEEE 802.11 wireless LANs [IEEE-802.11i]." Id.

"In order to maintain media independence, it is necessary for EAP to avoid consideration of media-specific elements. For example, EAP methods cannot be assumed to have knowledge of the lower layer over which they are transported, and cannot be restricted to identifiers associated with a particular usage environment (e.g. MAC addresses)." Id.

"Note that media independence may be retained within EAP methods that support Channel-Bindings or method-specific identification. An EAP method need not be aware of the content of an identifier in order to use it. This enables an EAP method to use media-specific identifiers such as MAC addresses without compromising media independence. Channel-Bindings are treated as opaque octets by EAP methods, so that handling them does not require media-specific knowledge." Id.

Method Independence

"By enabling pass-through, authenticators can support any method implemented on the peer and server, not just locally implemented methods. This allows the authenticator to avoid implementing code for each EAP method required by peers. In fact, since a pass-through authenticator is not required to implement any EAP methods at all, it cannot be assumed to support any EAP method-specific code." Id.

"As a result, as noted in [RFC3748], authenticators must by default be capable of supporting any EAP method. This is useful where there is no single EAP method that is both mandatory-to-implement and offers acceptable security for the media in use. For example, the [RFC3748] mandatory-to-implement EAP method (MD5-Challenge) does not provide dictionary attack resistance, mutual authentication or key derivation, and as a result is not appropriate for use in wireless LAN authentication [RFC4017]. However, despite this it is possible for the peer and authenticator to interoperate as long as a suitable EAP method is supported on the EAP server." Id.

Ciphersuite Independence

"Ciphersuite Independence is a requirement for Media Independence. Since lower layer ciphersuites vary between media, media independence requires that EAP keying material needs to be large enough (with sufficient entropy) to handle any ciphersuite." Id.

"While EAP methods may negotiate the ciphersuite used in protection of the EAP conversation, the ciphersuite used for the protection of the data exchanged after EAP authentication has completed is negotiated between the peer and authenticator within the lower layer, outside of EAP. For example, within PPP, the ciphersuite is negotiated within the Encryption Control Protocol (ECP) defined in [RFC1968], after EAP authentication is completed. Within [IEEE-802.11i], the AP ciphersuites are advertised in the Beacon and Probe Responses prior to EAP authentication, and are securely verified during a 4-way handshake exchange. Id.

"Since the ciphersuites used to protect data depend on the lower layer, requiring EAP methods have knowledge of lower layer ciphersuites would compromise the principle of Media Independence. Since ciphersuite negotiation occurs in the lower layer, there is no need for ciphersuite negotiation within EAP, and EAP methods generate keying material that is ciphersuite-independent." Id.

"Algorithms for deriving TSKs must not depend on the EAP method, although algorithms for TEK derivation may be specific to the EAP method. In order to allow a ciphersuite to be usable within the EAP keying framework, a specification must be provided describing how TSKs suitable for use with the ciphersuite are derived from exported EAP keying parameters." Id.

"It should be understood that an EAP authenticator or peer:
[a] may contain one or more physical or logical ports;
[b] may advertise itself as one or more "virtual" authenticators or peers;
[c] may utilize multiple CPUs;
[d] may support clustering services for load balancing or failover." Id.

Multiple Ports

"Both the EAP peer and authenticator may have more than one physical or logical port. A peer may simultaneously access the network via multiple authenticators, or via multiple physical or logical ports on a given authenticator. Similarly, an authenticator may offer network access to multiple peers, each via a separate physical or logical port. The situation is illustrated in FIG. 5 [see reproduction as FIG. 6 in this patent application]. Absent explicit specification within the lower layer, EAP keying material and parameters are not bound to a specific peer or authenticator port. Where the peer and authenticator identify themselves within the lower layer using a port identifier such as a link layer address, this creates a problem, because it may not be obvious to the peer which authenticator ports are associated with which authenticators. Similarly, it may not be obvious to the authenticator which peer ports are associated with which peers. As a result, the peer and authenticator may not be able to determine the scope of the EAP keying material. This is particularly problematic for lower layers where key caching is supported." Id.

"For example, where the EAP peer cannot identify the EAP authenticator, it will be unable to determine whether EAP keying material has been shared outside of its authorized scope, and therefore needs to be considered compromised. There is also a practical problem because the EAP peer will be unable to utilize the EAP authenticator key cache in an efficient way. The solution to this problem is for lower layers to identify EAP peers and authenticators unambiguously, without incorporating implicit assumptions about peer and authenticator architectures. Use of port identifiers is not recommended where peers and authenticators may support multiple ports." Id.

"In order to further limit the key scope the following measures are suggested:
[a] The lower layer may specify additional restrictions on key usage, such as limiting the use of EAP keying material and parameters on the EAP peer to the port over which on the EAP conversation was conducted.
[b] The backend authentication server and authenticator may implement additional attributes in order to further restrict the scope of EAP keying material. For example, in 802.11, the backend authentication server may provide the authenticator with a list of authorized Called or Calling-Station-Ids and/or SSIDs for which EAP keying material is valid.
[c] Where the backend authentication server provides attributes restricting the key scope, it is recommended that restrictions be securely communicated by the authenticator to the peer. This can be accomplished using the Secure Association Protocol, but also can be accomplished via the EAP method or the lower layer." Id.

Authenticator Architecture

"The EAP method conversation is between the EAP peer and server, as identified by the Peer-ID and Server-ID. The authenticator identity, if considered at all by the EAP method, is treated as an opaque blob for the purposes of Channel bindings. However, the Secure Association Protocol conversation is between the peer and the authenticator, and therefore the authenticator and peer identities are relevant to that exchange, and define the scope of use of the EAP keying material passed down to the lower layer." Id.

"Since an authenticator may have many ports, the authenticator identifier used within the Secure Association Protocol exchange should be distinct from any port identifier (e.g. MAC address). Similarly, where a peer may have multiple ports, and sharing of EAP keying material and parameters between peer ports of the same link type is allowed, the peer identifier used within the Secure Association Protocol exchange should also be distinct from any port identifier. While EAP Keying Material passed down to the lower layer is not intrinsically bound to particular authenticator and peer ports, Transient Session Keys (TSKs) may be bound to particular authenticator and peer ports by the Secure Association Protocol. However, a lower layer may also permit TSKs to be used on multiple peer and/or authenticator ports, providing that TSK freshness is guaranteed (such as by keeping replay counter state within the authenticator)." Id.

"This specification does not impose constraints on the architecture of the EAP authenticator or peer. Any of the authenticator architectures described in [RFC4118] can be used. For example, it is possible for multiple base stations and a "controller" (e.g. WLAN switch) to comprise a single EAP authenticator. In such a situation, the "base station identity" is irrelevant to the EAP method conversation, except perhaps as an opaque blob to be used in Channel Bindings. Many base stations can share the same authenticator identity." Id.

"AAA protocols such as RADIUS [RFC3579] and Diameter [RFC4072] provide a mechanism for the identification of AAA clients; since the EAP authenticator and AAA client are always co-resident, this mechanism is applicable to the identification of EAP authenticators." Id.

"RADIUS [RFC2865] requires that an Access-Request packet contain one or more of the NAS-Identifier, NAS-IP-Address and NAS-IPv6-Address attributes. Since a NAS may have more than one IP address, the NAS-Identifier attribute is recommended for the unambiguous identification of the EAP authenticator." Id.

"From the point of view of the AAA server, EAP keying material and parameters are transported to the EAP authenticator identified by the NAS-Identifier attribute. Since an EAP authenticator must not share EAP keying material or parameters with another party, if the EAP peer or AAA server detects use of EAP keying material and parameters outside the scope defined by the NAS-Identifier, the keying material must be considered compromised." Id.

Virtual Authenticators

"When a single physical authenticator advertises itself as multiple "virtual authenticators", the EAP peer and authenticator also may not be able to agree on the scope of the EAP keying material, creating a security vulnerability. For example, the peer may assume that the "virtual authenticators" are distinct and do not share a key cache, whereas, depending on the architecture of the physical authenticator, a shared key cache may or may not be implemented. Where EAP keying material is shared between "virtual authenticators" an attacker acting as a peer could authenticate with the "Guest" "virtual authenticator" and derive EAP keying material. If the virtual authenticators share a key cache, then the peer can utilize the EAP keying material derived for the "Guest" network to obtain access to the "Corporate Intranet" virtual authenticator." Id.

"Several measures are recommended to address these issues:

[d] Authenticators are required to cache associated authorizations along with EAP keying material and parameters and to apply authorizations consistently. This ensures that an attacker cannot obtain elevated privileges even where the key cache is shared between "virtual authenticators".

[e] It is recommended that physical authenticators maintain separate key caches for each "virtual authenticator".

[f] It is recommended that each "virtual authenticator" identify itself distinctly to the backend authentication server, such as by utilizing a distinct NAS-Identifier attribute. This enables the backend authentication server to utilize a separate credential to authenticate each "virtual authenticator"." Id.

Key Management

"EAP as defined in [RFC3748] supports key derivation, but not key management. While EAP methods may derive keying material, EAP does not provide for the management of exported or derived keys. For example, EAP does not support negotiation of the key lifetime of exported or derived keys, nor does it support re-key. Although EAP methods may support "fast reconnect" as defined in [RFC3748] Section 7.2.1, re-key of exported keys cannot occur without re-authentication. In order to provide method independence, key management of exported or derived keys should not be provided within EAP methods." Id.

Parent-Child Relationships

"When keying material exported by EAP methods expires, all keying material derived from the exported keying material expires, including the TSKs. When an EAP re-authentication takes place, new keying material is derived and exported by the EAP method, which eventually results in replacement of calculated keys, including the TSKs. As a result, while the lifetime of calculated keys can be less than or equal that of the exported keys they are derived from, it cannot be greater. For example, TSK re-key may occur prior to EAP re-authentication. Failure to mutually prove possession of keying material during the Secure Association Protocol exchange need not be grounds for deletion of the keying material by both parties; rate-limiting Secure Association Protocol exchanges could be used to prevent a brute force attack." Id.

Key Strength

"In order to guard against brute force attacks, EAP methods deriving keys need to be capable of generating keys with an appropriate effective symmetric key strength. In order to ensure that key generation is not the weakest link, it is recommended that EAP methods utilizing public key cryptography choose a public key that has a cryptographic strength meeting the symmetric key strength requirement." Id.

References:

The present invention provides a variety of advances and improvements over, among other things, the systems and methods described in the following references, the entire disclosures of which references are incorporated herein by reference.

1. [RFC2119] Bradner, S., "Key words for use in RFCs to Indicate Requirement Levels", BCP 14, RFC 2119, March 1997.

2. [RFC3748] Aboba, B., Blunk, L., Vollbrecht, J., Carlson, J., and H. Levkowetz, "Extensible Authentication Protocol (EAP)", RFC 3748, June 2004.

3. [RFC4306] Kaufman, C., "Internet Key Exchange (IKEv2) Protocol", RFC 4306, December 2005.

4. [I-D.ietf-eap-keying] Aboba, B., "Extensible Authentication Protocol (EAP) Key Management Framework", draft-ieff-eap-keying-09 (work in progress), January 2006.

SUMMARY OF THE INVENTION

The present invention improves upon the above and/or other background technologies and/or problems therein.

According to some embodiments, a channel binding method based on parameter binding in a key derivation procedure for authentication of a mobile supplicant to an access network includes cryptographically binding access network parameters to a key without needing to carry the parameters in authentication methods. In some examples, the authentication methods include EAP methods. In some other examples, the parameters include parameters advertised by an authenticator to the supplicant. In some other examples, the identity of the authenticator is one of the parameters. In some other examples, the method further includes deriving a channel binding key from a channel binding master key bound to a key binding blob using a key derivation function. In some other examples, the channel binding master key is at least 64 octets long and the key binding blob is an octet-string that is constructed from static parameters advertised from an authenticator using an authenticator-supplicant protocol. In some other examples, the method further includes a network side authenticator and the supplicant using the channel binding master key for protecting an authenticator-supplicant protocol, and, in some examples further includes, the supplicant obtaining the key binding blob from the authenticator using the authenticator-supplicant protocol.

In some embodiments, the method further includes that: a) a server and the supplicant create a channel binding key used for an authenticator; b) the server transfers the channel binding key to the authenticator; and c) the supplicant and the authenticator verify proof of possession of the channel binding key over an authenticator-supplicant protocol. In some examples, the method includes that the channel binding key is derived from a channel binding master key bound to a key binding blob associated with the authenticator using a key derivation function. In some other examples, the method further includes creating multiple channel binding keys from a single channel binding master key for multiple authenticators. In some other examples, the method includes using channel binding keys to form a hierarchical channel binding.

In some embodiments, the method includes creating multiple channel binding keys from a single channel binding master key for multiple authenticators using different key binding blobs for different authenticators. Moreover, in some embodiments, the method includes using channel binding keys to form a hierarchical channel binding.

In some embodiments, the key derivation function is computed based on CBK=kdf+(CBMK, KBB), where CBK represents channel binding key, CBMK represents channel binding master key, and KBB represents key binding blob.

In some embodiments, the authenticator is an EAP authenticator, and wherein the EAP authenticator receives and processes the channel binding key as a Master Session Key (MSK).

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 3 is an architectural diagram showing a basic channel binding mechanism according to some illustrative embodiments;

FIG. 4 is a schematic diagram depicting hierarchical channel binding according to some illustrative embodiments;

FIG. 5 is a schematic diagram showing EAP methodology according to the background; and FIG. 6 is a schematic diagram showing illustrative relationships between EAP peers, authenticators and servers according to the background.

DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Illustrative Architecture

Figure 1:
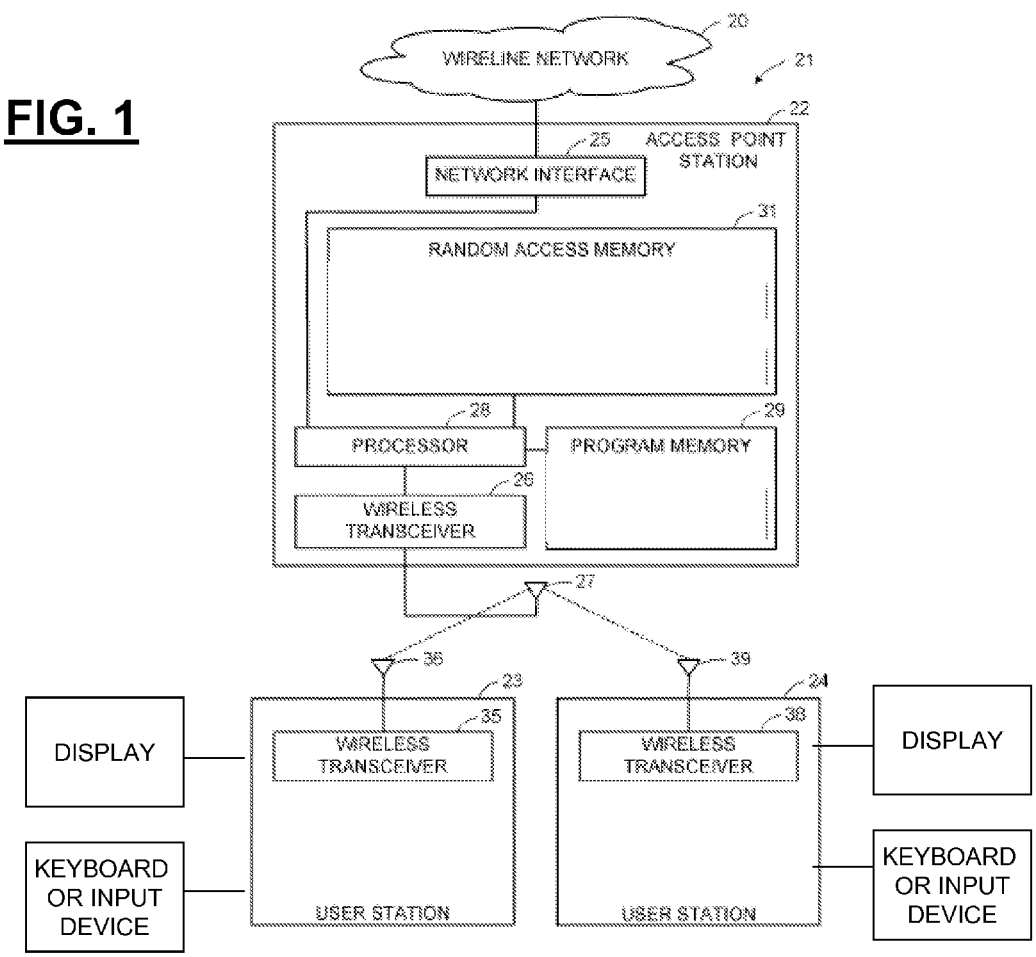
FIG. 1 is an architectural diagram showing exemplary sub-components of an illustrative access point and illustrative client devices or user stations according to some illustrative embodiments of the invention.

FIG. 1 depicts some illustrative architectural components that can be employed in some illustrative and non-limiting implementations including wireless access points to which client devices communicate. In this regard, FIG. 1 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

Figure 2:
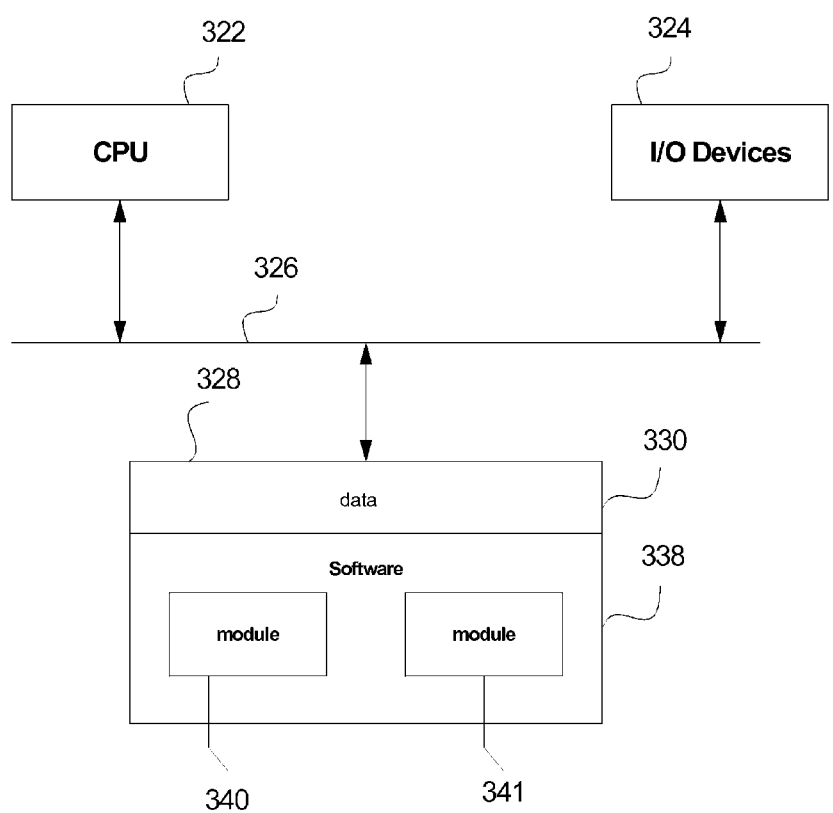
FIG. 2 is an architectural diagram showing an illustrative computer or control features that can be used to implement computerized process steps, to be carried out by devices, such as, e.g., an access point and/or a user station, in some embodiments of the invention.

FIG. 2 shows an illustrative computer or control unit that can be used to implement computerized process steps, to be carried out by devices, such as, e.g., an access point and/or a user station, in some embodiments of the invention. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Discussion of the Preferred Embodiments

1. Introduction

As described above, Extensible Authentication Protocol (EAP) is an authentication framework which supports multiple authentication algorithms known as "EAP methods" [RFC3748]. In the framework, an EAP peer (which can involve, e.g., in some embodiments, part of a mobile node or a module associated with the mobile node) and an EAP authenticator (which can involve, e.g., in some embodiments, part of an access point or a module associated with the access point) use a key generated and exported by an EAP method to bootstrap ciphersuites used for protecting their access network. This key is referred to as MSK (Master Session Key). A framework for the generation, transport and usage of MSK is described in [I-D.ietf-eap-keying], discussed above.

For reference, a ciphersuite includes, by way of example, a set of cryptographic algorithms used to: protect information required to create shared keys (key exchange); encrypt messages exchanged between clients and servers (bulk encryption); and generate message hashes and signatures to ensure the integrity of a message (message authentication).

Each access network has its own set of parameters advertised by the EAP authenticator to EAP peers. By way of example, the identity of the EAP authenticator is one of such parameters. The access network parameters would need to be cryptographically bound to the MSK to avoid possible security flaws.

A mechanism that is described in [RFC3748] to create such a binding is based on communicating the access network parameters over a protected channel of an EAP method to help the EAP peer and the EAP server detect a mismatch between the parameters exchanged over the protected channel and the ones advertised by the EAP authenticator to the EAP peer and the EAP server.

According to the preferred embodiments, an alternative Channel Binding mechanism is provided that creates a binding between a key exported by, e.g., EAP method and access network parameters. In the preferred embodiments, the mechanism has the following characteristics:

The mechanism preferably retains EAP invariants, including mode independence, media independence, method independence and ciphersuite independence.

The mechanism preferably does not require any change to existing EAP authenticators.

The mechanism is scalable to support a large number of EAP authenticators.

2. Terminology

Channel Binding Key (CBK)

A key that is derived from a Channel Binding Master Key (CBMK) and cryptographically bound to a Key Binding Blob (KBB) using a Key Derivation Function (KDF). In the preferred embodiments, a CBK is at least 64 octets in length.

Channel Binding Master Key (CBMK)

A key from which a CBK is derived using a KDF. By way of example, an MSK or an EMSK is a CBMK. In the preferred embodiments, a CBMK is at least 64 octets in length.

Key Binding Blob (KBB)

An octet-string that is constructed from static parameters advertised from an authenticator using an Authenticator-Supplicant Protocol (ASP).

Server

An entity that creates a CBK and transfers it to the authenticator. A server is a creator as well as a sender of the CBK. In some embodiments, an EAP server is a server of the mechanisms of the preferred embodiments.

Authenticator

A network-side entity that uses a CBK for an Authenticator-Supplicant Protocol (ASP). In various embodiments, an authenticator can be either co-located or not co-located with the server in the same equipment. In some embodiments, an EAP authenticator is an authenticator of the mechanisms of the preferred embodiments.

Supplicant

A user-side entity that uses a CBK for an Authenticator-Supplicant Protocol (ASP). In some embodiments, a supplicant is a creator as well as an owner of the CBK. In some embodiments, an EAP peer is a supplicant of the mechanisms of the preferred embodiments.

Authenticator-Supplicant Protocol (ASP)

A protocol that is executed between a supplicant and an authenticator and uses a CBK for protecting the protocol. In some embodiments, the supplicant obtains the KBB from the authenticator using the ASP.

3. Channel Binding Mechanism

According to the preferred embodiments, a new basic channel binding mechanism is employed. Reference is now made to FIG. 3 which illustrates a basic channel binding mechanism according to the preferred embodiments. In this regard, FIG. 3 depicts an illustrative server 1, an illustrative authenticator 2, and an illustrative supplicant 3.

As shown in FIG. 3, the channel binding mechanism is carried out in these three components using the following steps.

STEP 1 (CBK Creation): In this first step, depicted using reference numerals (1) in FIG. 3, the server 1 and the supplicant 3 create a CBK used for an authenticator 2. In the preferred embodiments, the CBK is derived from a CBMK and bound to a KBB associated with the authenticator using a KDF. In the preferred embodiments, the KBB is pre-configured on the server.

STEP 2 (CBK Transfer): In this second step, depicted using reference numeral (2) in FIG. 3, the server 1 transfers the CBK to the authenticator 2.

STEP 3 (CBK Verification): In this third step, depicted using reference numeral (3) in FIG. 3, the supplicant and authenticator verify proof of possession of the CBK over the ASP. In the preferred embodiments, after successful verification of proof of possession of the CBK, the supplicant and the authenticator are able to use the CBK in the ASP.

3.1. Creating Multiple CBKs

In some embodiments, multiple CBKs can be created from a single CBMK for multiple authenticators by, e.g., using different KBBs for different authenticators.

3.2. Hierarchical Channel Binding

In some embodiments, the Channel Binding mechanism allows CBKs to form a hierarchy, such as, e.g., depicted in FIG. 4. Among other things, Hierarchical Channel Binding can be employed to address certain issues related to, e.g., scalability and/or mobility.

For example, if there are a large number of authenticators within the administrative domain of a server, the domain can be partitioned into multiple sub-domains where each sub-domain has an authenticator. Here, the server can generate CBKs for the authenticators of the sub-domains, and each authenticator can derive child CBKs for its child authenticators.

As another example, in the case of a roaming scenario (such as, e.g., with a roaming supplicant), a server of one administrative domain can be employed to generate CBKs for authenticators in other administrative domains, and the authenticators in the other administrative domains can create child CBKs for their child authenticators in their domains.

In some preferred embodiments, Hierarchical Channel Binding can provide at least some of the following advantages:

In some embodiments, the number of KBBs pre-configured on the server can be reduced (e.g., keeping the number at a more manageable level).

In some embodiments, the supplicant does not need to perform re-authentication to generate a new CBK when it switches from one child authenticator to another when the child authenticators belong to the same parent authenticator.

In hierarchical Channel Binding, CBK verification may be performed at each level of the key hierarchy or only at the lowest level of the hierarchy. In embodiments where the CBK verification is performed only at the lowest level of the hierarchy, the lowest level authenticator preferably advertises, in the lowest level ASP, the parameters necessary to construct a KBB at each level of the hierarchy. In various embodiments, the hierarchy can include two levels, three levels (e.g., including child and grand-child levels), four levels (e.g., including child, grand-child and great-grand-child levels), or any larger number as may be desired based on circumstances.

3.3. Key Derivation Function

According to some illustrative and non-limiting embodiments, a CBK can be computed using pseudo random function (prf+) defined in IKEv2 [RFC4306] in the following way.

$$CBK = kdf + (CBMK, KBB);$$

wherein KDF=Key Derivation Function.

For reference, a "pseudo-random function" is one of the cryptographic algorithms negotiated in, e.g., the IKE exchange. See RFC4306. A pseudo-random function is used for the construction of keying material for all of the cryptographic algorithms used in both the IKE_SA and the CHILD_SAs. See Id. As described in RFC4306, "[k]eying material will always be derived as the output of the negotiated prf algorithm. Since the amount of keying material needed may be greater than the size of the output of the prf algorithm, we will use the prf iteratively. We will use the terminology prf+ to describe the function that outputs a pseudo-random stream based on the inputs to a prf as follows: (where | indicates concatenation)

$$prf+(K,S)=T1|T2|T3|T4|\ldots$$

wherein:
T1=prf (K, S |0x01)
T2=prf(K, T1|S|0x02)
T3=prf (K, T2|S|0x03)
T4=prf(K, T3|S|0x04)
continuing as needed to compute all required keys. The keys are taken from the output string without regard to boundaries (e.g., if the required keys are a 256-bit Advanced Encryption Standard (AES) key and a 160-bit HMAC key, and the prf function generates 160 bits, the AES key will come from T1 and the beginning of T2, while the HMAC key will come from the rest of T2 and the beginning of T3). The constant concatenated to the end of each string feeding the prf is a single octet." Id.

3.4. Key Scope

In preferred embodiments, the scope of a CBK should be within the pair of the supplicant and the authenticator that use the CBK.

3.5. Key Name

In preferred embodiments, the name of a CBK is the string concatenation of the name of the CBMK and "CBK".

3.6. Key Lifetime

In preferred embodiments, the lifetime of a CBK is determined based on the guidelines on exported and calculated key lifetimes described in [I-D.ietf-eap-keying], incorporated herein by reference above.

3.7. Key Caching

In some embodiments, where explicitly supported by the ASP, the ASP can cache a CBK.

4. EAP Authenticator Consideration

In the preferred embodiments, when the mechanisms according to the preferred embodiments are employed, an EAP authenticator acts as an authenticator of these mechanisms. In such cases, the EAP authenticator preferably receives and processes a CBK as if it were an MSK. Among other things, this enables the mechanism to work with the already deployed EAP authenticators without any modifications to them.

5. Authenticator-Supplicant Protocol Requirements

In the preferred embodiments, any ASP (e.g., PANA and IEEE 802.11i) that supports the mechanisms of embodiments of the present invention should define how a KBB is constructed from the parameters specific to the ASP, where the KBB construction mechanism should satisfy the following requirements:

Only static parameters, such as, e.g., the identity of the authenticator, are used for constructing KBBs.
The probability of KBB collision in which the same KBB is associated with different authenticators of the ASP is either zero or reasonably low.

6. EAP Method Requirements

In the preferred embodiments, any EAP method that supports the mechanism according to the preferred embodiments should provide at least all of the following functionalities.

1. Negotiation on enabling this mechanism. Preferably, the EAP method should support the following negotiation over a protected channel.

A functionality for the EAP peer to indicate the EAP server the desire to use this mechanism.
A functionality to enable this mechanism when the EAP peer has indicated the desire to use this mechanism and the EAP server implements this mechanism.
A functionality to disable this mechanism when the EAP peer did not indicate the desire to use this mechanism.
A functionality to fail the EAP method conversation when the EAP peer has indicated the desire to use this mechanism while the EAP server does not implement this mechanism.

2. Negotiation on or specification of a hash algorithm. Preferably, the EAP method should either provide, over a protected channel, a mechanism for negotiating on a hash algorithm used for prf+, or specify one hash algorithm used for prf+.

7. Security Considerations

In the preferred embodiments, the mechanisms described in this document can be used to improve the security characteristics of the EAP key management framework in the following aspects.

A secure association will not be established via the ASP if there is a difference in the KBB advertised by the EAP authenticator to the EAP peer and the KBB configured on the EAP server.
Even if a CBK is mis-transferred to a non-intended authenticator (i.e., one authenticator other than the intended authenticator), the CBK can not be used by the non-intended authenticator as long as the KBB used for deriving the CBK does not collide between the intended and unintended authenticators.

The security level of this mechanism depends on probability of KBB collision among authenticators of the same ASP and among authenticators of different ASPs.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A channel binding method based on parameter binding in a key derivation procedure for authentication of a mobile supplicant to an access network, comprising:
cryptographically binding access network parameters to a key without needing to carry the parameters in authentication methods;
further including deriving a channel binding key from a channel binding master key bound to a key binding blob using a key derivation function; and
wherein said key binding blob is a string that is constructed from static parameters advertised from an authenticator.

2. The method of claim 1, wherein said authentication methods include EAP methods.

3. The method of claim 1, wherein said parameters include parameters advertised by an authenticator to said supplicant.

4. The method of claim 3, wherein the identity of the authenticator is one of said parameters.

5. The method of claim 1, wherein said channel binding master key is at least 64 octets long.

6. A channel binding method based on parameter binding in a key derivation procedure for authentication of a mobile supplicant to an access network, comprising:
using an extensible authentication protocol server to cryptographically bind access network parameters to a channel binding key and to transmit said channel binding key to an extensible authentication protocol authenticator for use by the extensible authentication protocol authenticator as an extensible authentication protocol master session key without said extensible authentication protocol authenticator needing to carry said access network parameters in extensible authentication protocol authentication methods;
including using said extensible authentication protocol server to derive said channel binding key from a channel binding master key bound to a key binding blob using a key derivation function;
wherein said key binding blob is a string that is constructed from static parameters advertised from said extensible authentication protocol authenticator.

7. The method of claim 1, wherein said key binding blob is an octet-string that is constructed from static parameters advertised from an authenticator using an authenticator-supplicant protocol.

8. The method of claim 1, including a network side authenticator and said supplicant using the channel binding master key for protecting an authenticator-supplicant protocol.

9. The method of claim 8, further including said supplicant obtaining the key binding blob from said authenticator using the authenticator-supplicant protocol.

10. The method of claim 1, further including that:
a) a server and the supplicant create a channel binding key used for an authenticator;
b) the server transfers the channel binding key to the authenticator; and
c) the supplicant and the authenticator verify proof of possession of the channel binding key over an authenticator-supplicant protocol.

11. The method of claim 10, further including that the channel binding key is derived from a channel binding master key bound to a key binding blob associated with the authenticator using a key derivation function.

12. The method of claim 1, further including creating multiple channel binding keys from a single channel binding master key for multiple authenticators.

13. The method of claim 12, further including using channel binding keys to form a hierarchical channel binding.

14. The method of claim 1, further including creating multiple channel binding keys from a single channel binding master key for multiple authenticators using different key binding blobs for different authenticators.

15. The method of claim 14, further including using channel binding keys to form a hierarchical channel binding.

16. The method of claim 12, further including creating multiple channel binding keys from a single channel binding master key for multiple authenticators using different key binding blobs for different authenticators.

17. The method of claim 16, further including using channel binding keys to form a hierarchical channel binding.

18. The method of claim 1, wherein said key derivation function is computed based on CBK =kdf+(CBMK, KBB), where CBK represents channel binding key, CBMK represents channel binding master key, and KBB represents key binding blob.

19. The method of claim 3, wherein said authenticator is an EAP authenticator, and wherein the EAP authenticator receives and processes the channel binding key as a Master Session Key (MSK).

20. An authentication server configured to perform a channel binding method based on parameter binding in a key derivation procedure for authentication of a mobile supplicant to an access network, comprising:
a processor configured to create a channel binding key used by an authenticator,
which key is derived from a channel binding master key that is bound to a key binding blob associated with the authenticator using a key derivation function,
such as to cryptographically bind access network parameters to said channel binding key without needing to carry the parameters in authentication methods;
said authentication server being configured to receive said key binding blob from an authenticator, said key binding blob being a string that is constructed from static parameters advertised from said authenticator; and
said server being configured to transmit said key, that is derived from the channel binding master key that is bound to the key binding blob associated with the authenticator using the key derivation function, to said authenticator for use by the authenticator as an authentication master session key without said authenticator needing to carry said access network parameters in authentication methods.

21. The authentication server of claim 20, wherein said authentication server is an extensible authentication protocol (EAP) server.

* * * * *

UNITED STATES PATENT AND TRADEMARK OFFICE
CERTIFICATE OF CORRECTION

PATENT NO.      : 8,239,671 B2
APPLICATION NO. : 11/379568
DATED           : August 7, 2012
INVENTOR(S)     : Oba It is certified that error appears in the above-identified patent and that said Letters Patent is hereby corrected as shown below:

In the Specification

In Column 5, Line 55, delete "imporVexport," and insert -- import/export, --, therefor.

In Column 10, Line 5, delete "ieff-eap-keying-09" and insert -- ietf-eap-keying-09 --, therefor.

In Column 11, Line 60, delete "user stations 23, 25." and insert -- user stations 23, 24. --, therefor.

In Column 15, Line 15, delete "T1=prf(K, S |0x01)" and insert -- T1=prf(K, |S|0x01) --, therefor.

Signed and Sealed this
Twenty-eighth Day of October, 2014

Michelle K. Lee
*Deputy Director of the United States Patent and Trademark Office*